Oct. 24, 1944.　　　R. H. WHISLER, JR　　　2,360,993
SHOCK ABSORBER CONSTRUCTION
Filed Aug. 3, 1942
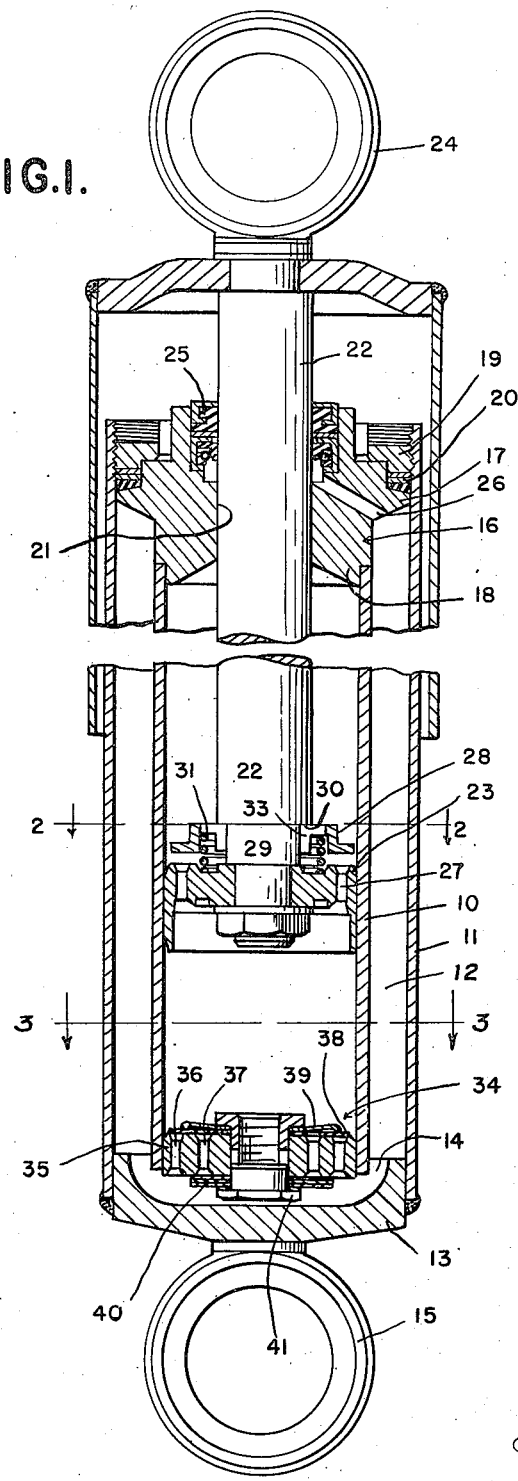
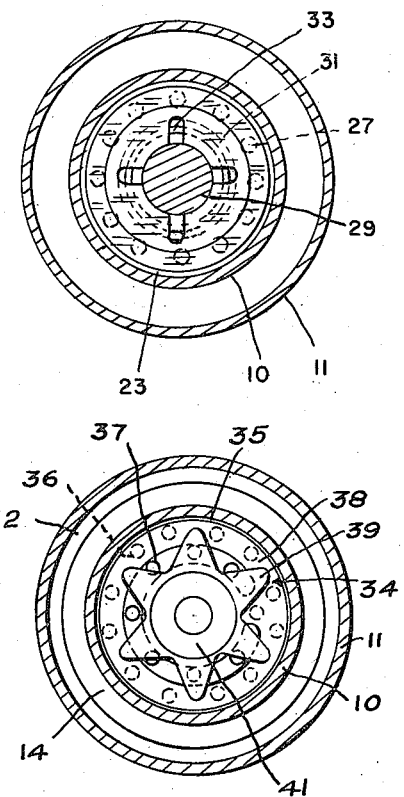
INVENTOR.
RALPH H. WHISLER JR.
BY
ATTORNEYS Patented Oct. 24, 1944

2,360,993

UNITED STATES PATENT OFFICE 2,360,993

SHOCK ABSORBER CONSTRUCTION

Ralph H. Whisler, Jr., Monroe, Mich., assignor to Monroe Auto Equipment Company, Monroe, Mich., a corporation of Michigan Application August 3, 1942, Serial No. 453,412

1 Claim. (Cl. 188—88)

This invention relates to hydraulic shock absorbers of the tubular direct acting type having a cylinder adapted to contain a suitable fluid and having a piston reciprocably mounted in the cylinder.

Although shock absorbers of the above general type may be advantageously employed in practically any case where it is desired to control relative movement between a pair of relatively movable parts, nevertheless, they are especially applicable to vehicles for controlling relative movement between the sprung and unsprung vehicle assemblies.

Considerable difficulty has been encountered in the past in providing a shock absorber having the flexibility and control required to afford the optimum results under widely varying conditions. Due to the design characteristics of conventional types of shock absorbers, relatively slight movements of the unsprung assembly are substantially damped or resisted, especially if they occur in rapid succession and the force reaction resulting from this damping action of the shock absorbers is transferred to the sprung assembly in the form of vibrations which detrimentally effect the riding qualities of the vehicle.

In accordance with the present invention, the above objection is overcome by providing a shock absorber constructed in such a manner that very little or no resistance is afforded to normal or relatively slow piston movements in either direction in the cylinder but extremely high resistance is offered to fast piston movement, particularly on the rebound stroke.

Another object of this invention is to provide a shock absorber having a ported piston and having a valve responsive to relatively high accelerations of the piston on the rebound stroke to close the ports through the piston and thereby prevent or substantially minimize the long amplitudes which usually result from high initial accelerations of the piston.

A still further feature of this invention is to provide a shock absorber having means for also substantially restricting relatively fast initial movement of the piston on the compression stroke.

The foregoing, as well as other objects, will be made more apparent when this description proceeds, especially when considered in connection with the accompanying drawing, wherein:

Figure 1 is a longitudinal sectional view showing a shock absorber constructed in accordance with this invention; and Figure 2 is a cross sectional view taken on the plane indicated by the line 2—2 of Figure 1.

Figure 3 is a cross sectional view taken substantially on line 3—3 of Figure 1.

In Figure 1 of the drawing I have illustrated a hydraulic shock absorber of the direct acting tubular type having a cylinder 10 and having a tube 11 surrounding the cylinder in concentric relation thereto. The internal diameter of the tube 11 is substantially greater than the outside diameter of the cylinder 10 and cooperates with the latter to form an annular reserve chamber 12.

The lower end of the reserve chamber 12 is closed by a cap 13 having ports 14 establishing communication between the lower end of the reserve chamber 12 and the corresponding end of the cylinder 10. The cap 13 is also provided with a fixture 15 of a design which enables the same to be readily pivotally connected to one of a pair of relatively movable parts, not shown herein. In the present instance, the fixture 15 is adapted to be pivotally connected to the unsprung assembly of a vehicle and any one of a number of accepted methods may be employed for accomplishing this result.

The upper end of the cylinder 10 is closed by a head 16 having an enlarged portion 17 at the upper end of sufficient diameter to frictionally engage the inner surface of the tube 11 and having a reduced portion 18 secured to the upper end of the cylinder 10. The head 16 is secured in place by means of a ring 19 which is threadedly mounted in the upper end of the tube 11 above the enlargement 17 and cooperates with this enlargement to clamp a suitable seal 20 in place. The seal 20 coacts with the enlargement 17 to close the upper end of the reserve chamber 12 and to prevent escape of fluid from the reserve chamber.

It will also be noted from Figure 1 of the drawing that the head 16 is formed with a centrally arranged bore 21 of sufficient diameter to slidably receive a piston rod 22 having the lower end operatively connected to a piston 23. The piston 23 occupies a position in the cylinder 10 and slidably engages the inner surface of the cylinder. The upper end of the piston rod 22 is provided with a fixture 24 of a design which enables the same to be readily pivotally connected to the sprung assembly (not shown) of a suitable vehicle.

In order to prevent fluid in the cylinder 10 from escaping along the piston rod 22, the upper end of the head 16 is counterbored to receive a suitable seal 25. The seal 25 frictionally engages the piston rod 22 throughout the circumference of the latter and is assisted in preventing fluid from escaping along the rod 22 by means of a port 26. The port 26 is formed in the head 16 and establishes communication between the reserve chamber 12 and the counterbore at a point below the seal 25.

Referring again to Figure 1 of the drawing, it will be noted that the piston 23 is formed with a plurality of ports 27 therethrough. These ports are of sufficient internal diameter to enable relatively free flow of fluid therethrough during movement of the piston 23 in opposite directions. In accordance with this invention the ports are controlled by a single slide valve 28 slidably mounted on the piston rod 22 above the piston 23. In detail, it will be noted that the valve 28 is mounted on a reduced portion 29 of the piston rod 22 for sliding movement between the upper surface of the piston and an annular shoulder 30 formed on the piston rod by the reduced portion 29.

The valve 28 is normally held in its open or uppermost position against the shoulder 30 by means of a coil spring 31. The coil spring 31 surrounds the reduced portion 29 of the piston rod 22 and the opposite ends of the spring respectively engage the top surface of the piston 23 and the adjacent surface of the valve. As shown particularly in Figure 2 of the drawing, the central portion of the valve 28 is formed with a plurality of openings 33 therethrough to facilitate the passage of fluid through the ports 27 when the valve is in its open position.

It follows from the above that if the piston 23 is relatively moved at a normal rate in an upward direction from the position shown in Figure 1, fluid in the portion of the cylinder above the piston is permitted to flow to the portion of the cylinder below the piston through the ports 27. The combined cross sectional area of the ports 27 is such that very little or no resistance is offered to the passage of fluid through the piston and, as a consequence, the piston is relatively moved in an upward direction at a substantially unretarded rate until the pressure in the portion of the cylinder 10 above the piston exceeds the force of the spring 31. When this condition exists, the valve 28 is forced downwardly to its closed position with respect to all of the ports 27 and continued upward movement of the piston is highly resisted. It will, of course, be understood that the action of the spring 31 is also overcome and the valve 28 is closed if for any reason upward movement of the piston is initiated at a high or abnormal velocity. As a consequence, the usual long amplitude resulting from this action is avoided and far superior riding qualities are obtained.

When the piston 23 is relatively moved in a downward direction in the cylinder, the valve 28 remains in its open position and does not appreciably retard the transfer of fluid from the portion of the cylinder 10 below the piston to the portion of the cylinder above the piston.

Although fluid is permitted to flow relatively freely through the piston as the latter moves downwardly in the cylinder, nevertheless, the pressure in the cylinder below the piston rises at the beginning of downward travel of the piston rod. This is due to the displacement of the piston rod 22 which causes the volume of the portion of the cylinder below the piston to diminish at a faster rate than the rate at which the volume above the cylinder increases. In the present instance, the excess fluid in the cylinder below the piston is discharged into the reserve chamber 12 through the ports 14 and the rate of escape of this fluid is controlled to provide a damping action on continued downward travel of the piston 23 in the cylinder.

Also by reason of the displacement of the piston rod 22, it is necessary to replenish the cylinder with fluid when the piston moves in an upward direction in the cylinder and this transfer of fluid is also accomplished by the ports 14. In this instance, however, fluid is permitted to flow relatively freely from the reserve chamber through the ports 14 into the lower end of the cylinder.

As shown in Figure 1, the transfer of fluid between the reserve chamber and cylinder is controlled in both the above instances by a compound valve 34. The valve 34 is secured in the lower end of the cylinder 10 and comprises a plate 35 having two sets of ports 36 and 37 therethrough. The outer set of ports 36 is normally closed by a disc valve 38 clamped at its center on the top surface of the plate and normally urged to its closed position by a light substantially star shaped spring 39. The arrangement is such that when the piston is relatively moved in an upward direction, fluid is permitted to flow relatively freely from the reserve chamber to the cylinder in amounts necessary to compensate for the increased volume of the cylinder below the piston which results from the displacement of the piston rod 22.

The inner set of ports 37 is closed by a laminated disc valve 40 clamped at its center against the bottom surface of the plate 35 by means of a suitable fastener element 41. The valve 40 is opened by the pressure rise in the lower end of the cylinder as the piston is moved in a downward direction and the pressure required to open this valve is sufficiently high to produce a substantial retarding effect on the piston rod as it approaches the lower end of the cylinder 10.

What I claim as my invention is:

A direct acting hydraulic shock absorber having a cylinder, a reserve chamber communicating with the cylinder adjacent one end of the latter, a piston in said cylinder having a port therethrough permitting relatively free flow of fluid through the piston as the latter moves in opposite directions in the cylinder, a valve for the port supported for sliding movement relative to the piston at the side of said piston opposite the side facing the point of communication between the reserve chamber and cylinder, said valve being engageable with the piston to close the port therein, yieldable means acting on said valve normally maintaining the latter in its open position, and a pressure operated valve for closing communication between the cylinder and reserve chamber.

RALPH H. WHISLER, Jr.